(12) United States Patent
Ito

(10) Patent No.: US 11,954,377 B2
(45) Date of Patent: Apr. 9, 2024

(54) INFORMATION PROCESSING APPARATUS AND CONTROL METHOD

(71) Applicant: CANON KABUSHIKI KAISHA, Tokyo (JP)

(72) Inventor: Aya Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/188,343

(22) Filed: Mar. 22, 2023

(65) Prior Publication Data

US 2023/0221901 A1 Jul. 13, 2023

Related U.S. Application Data

(63) Continuation of application No. 17/730,012, filed on Apr. 26, 2022, now Pat. No. 11,720,298, which is a continuation of application No. 17/096,756, filed on Nov. 12, 2020, now Pat. No. 11,340,844.

(30) Foreign Application Priority Data

Nov. 13, 2019  (JP) ................................. 2019-205589

(51) Int. Cl.
  *G06T 7/00*     (2017.01)
  *G06F 3/12*     (2006.01)
(52) U.S. Cl.
  CPC .......... *G06F 3/1208* (2013.01); *G06F 3/1256* (2013.01); *G06T 7/001* (2013.01); *G06T 2207/10024* (2013.01); *G06T 2207/30144* (2013.01)

(58) Field of Classification Search
  CPC ..... G06F 3/1256; G06T 7/001; G06T 7/0002; G06T 7/00; G06T 7/11; G06T 2207/30144
  USPC ..... 358/1.14, 1.18, 3.26, 504, 538; 382/112, 382/164, 180
  See application file for complete search history.

(56) References Cited

U.S. PATENT DOCUMENTS

2019/0176462 A1* 6/2019 Engelhardt ............. B41F 11/02
2020/0356318 A1* 11/2020 Wei ....................... G06F 3/1234

FOREIGN PATENT DOCUMENTS

| JP | 2005217931 A | 8/2005 |
| JP | 2010-071951 A | 4/2010 |
| JP | 2011158421 A | 8/2011 |

* cited by examiner

Primary Examiner — Jamares Q Washington
(74) Attorney, Agent, or Firm — Canon U.S.A., Inc. IP Division

(57) ABSTRACT

In a case where an inspection level to be used in determining quality of an image of an inspected surface of a printed sheet is set based on a comparison between a captured image resulting from imaging the inspected surface and a reference image, a plurality of inspection regions varying in inspection level is set for the reference image. In a case where an overlap region is present in the plurality of inspection regions, an inspection level of the overlap region is identified based on a predetermined priority. Further, the identified inspection level of the overlap region is displayed.

16 Claims, 11 Drawing Sheets

INSPECTION SETTINGS

REFERENCE IMAGE REPLACEMENT — 0602

0603

MISALIGNMENT SETTING — 0604
☐ MISALIGNMENT (VERTICAL): 1 mm
☐ MISALIGNMENT (LATERAL): 2 mm

INSPECTION PARAMETER SETTING
☑ IMPORTANT — 0605
CIRCULAR DEFECT: LEVEL 7 ▶
LINEAR DEFECT: LEVEL 6 ▶
▼ STANDARD — 0620
CIRCULAR DEFECT: LEVEL 5 ▶
LINEAR DEFECT: LEVEL 4 ▶
▼ INSPECTION EXCLUSION: EXCLUSION — 0621

0601
0627
0629
0628
0630

CANCEL — 0607
COMPLETE — 0606

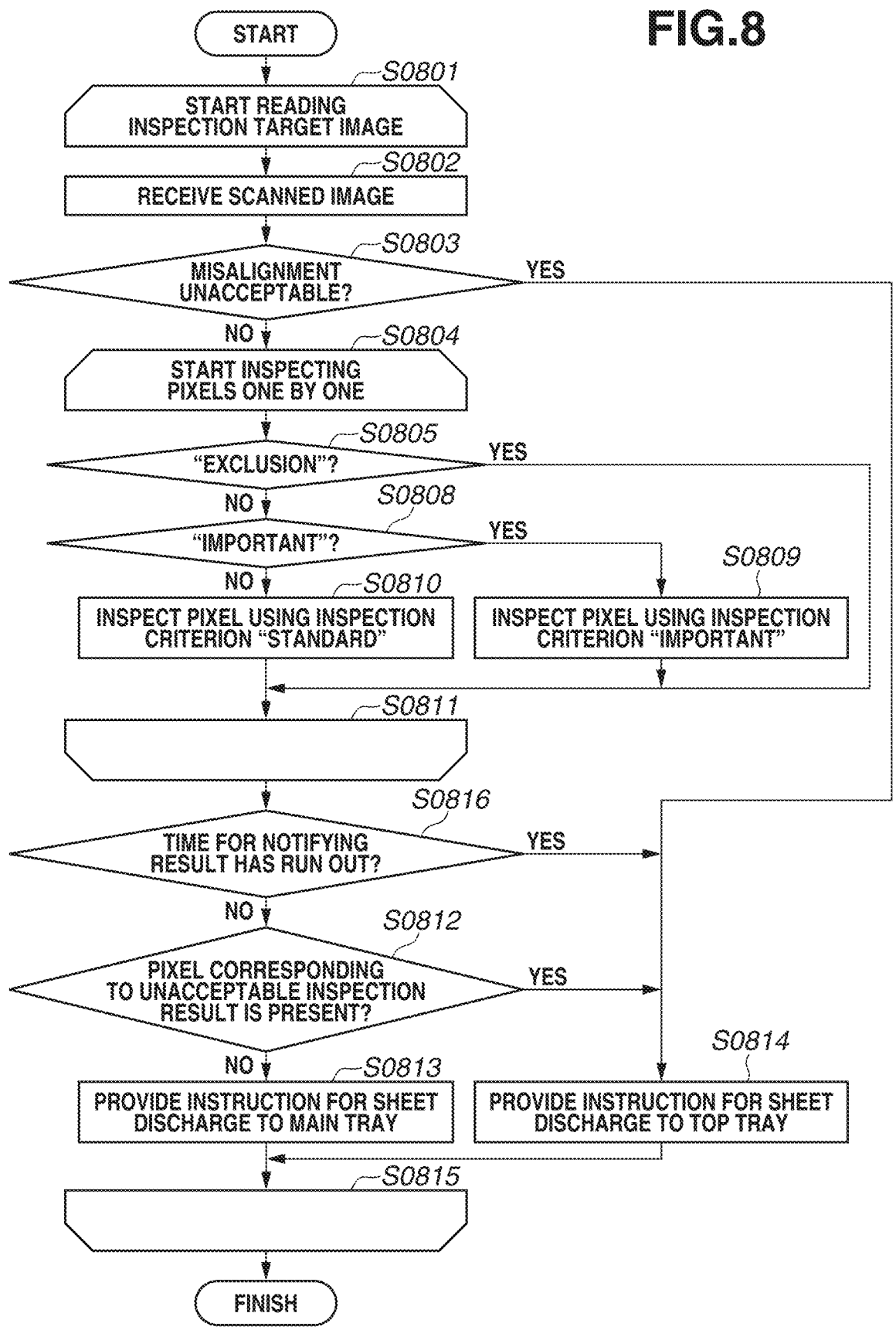

INFORMATION PROCESSING APPARATUS AND CONTROL METHOD

CROSS-REFERENCE TO RELATED APPLICATION

This application is a Continuation of U.S. application Ser. No. 17/730,012, filed Apr. 26, 2022; which is a Continuation of U.S. application Ser. No. 17/096,756, filed Nov. 12, 2020, which claims priority from Japanese Patent Application No. 2019-205589, filed Nov. 13, 2019, both of which are hereby incorporated by reference herein in their entireties.

BACKGROUND

Technical Field

The present disclosure relates to a technique of inspecting the quality of a printed sheet in a printing apparatus.

Description of the Related Art

Some known inspection apparatuses read a sheet printed by a printing apparatus and inspects the quality of the printed sheet. The inspection apparatus is capable of detecting image defects, such as dirt and print omission, errors in text, bar code quality, and the like.

Required quality varies depending on a business type and a printed sheet of a user, and thus it is important to perform an inspection desirable and sufficient for an inspection requirement. If an inspection criterion is too loose, printed sheets having defects can be shipped. However, if an inspection criterion is too strict, a printed sheet that is to be treated as a non-defective may be determined to be a defective, so that the number of discarded sheets can increase, or an additional burden of visually checking whether defective sheets have defects can be placed on a user.

To address such an issue, Japanese Patent Application Laid-Open No. 2005-217931 discusses a technique of applying different inspection criteria to a fixed region and a variable region in variable data printing is discussed.

In Japanese Patent Application Laid-Open No. 2005-217931, however, a case where regions to which different inspection criteria are applied overlap within an image is not discussed. For this reason, in a case where regions to which inspection criteria are applied overlap within an image, a user cannot check whether an inspection is performed using a desired inspection criterion. Hence there is such an issue that it is difficult to check whether an inspection is performed by applying an inspection criterion desired by a user to a user-desired region of user-desired print data.

SUMMARY

The present disclosure is directed to presentation for enabling a user to easily recognize which inspection criterion is to be applied to a pixel in a case where there is an overlap between inspection regions to which different inspection criteria are applied.

According to an aspect of the embodiments, an information processing apparatus sets an inspection level to be used in determining quality of an image of an inspected surface of a printed sheet, based on a comparison between a captured image resulting from imaging the inspected surface and a reference image. The information processing apparatus includes a setting unit, an identification unit, and a display control unit. The setting unit is configured to set a plurality of inspection regions varying in inspection level, for the reference image. The identification unit is configured to identify, in a case where an overlap region is present in the plurality of inspection regions, the inspection level of the overlap region based on a predetermined priority. The display control unit is configured to display the identified inspection level of the overlap region.

Further features of the disclosure will become apparent from the following description of exemplary embodiments with reference to the attached drawings.

BRIEF DESCRIPTION OF THE DRAWINGS

FIGS. 6A, 6B, and 6C each illustrate an inspection setting screen.

FIG. 8 is a flowchart illustrating inspection operation of the inspection apparatus.

DESCRIPTION OF THE EMBODIMENTS

Exemplary embodiments of the present disclosure will be described below with reference to the accompanying drawings. The present disclosure is applicable to an inspection apparatus irrespective of whether the inspection apparatus is a single apparatus or a plurality of apparatuses if a function according to the present disclosure is implemented, unless otherwise specified. The inspection apparatus may be connected to other apparatuses via networks such as a local area network (LAN) and a wide area network (WAN) to perform processing if a function according to the present disclosure is implemented, unless otherwise specified. In other words, a system configuration in which various terminals to be described in the following exemplary embodiments are connected is merely an example, and there are various configuration examples depending on the intended use and purpose.

Figure 1:
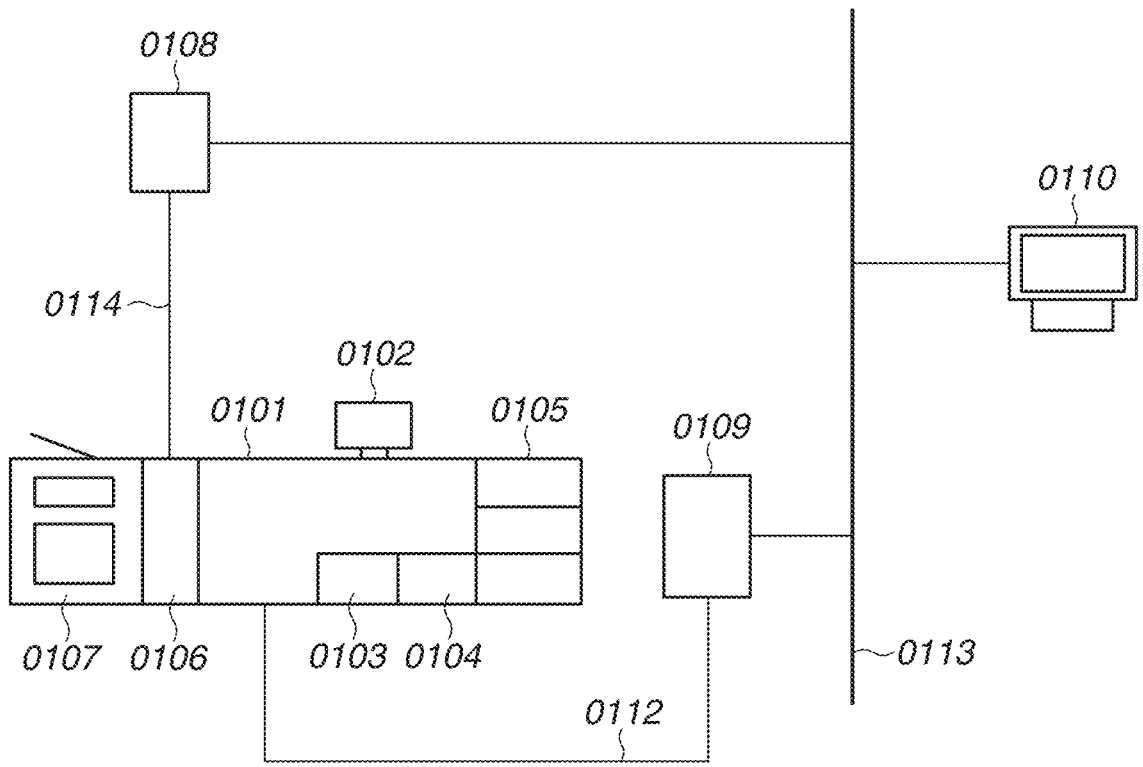
FIG. 1 is a schematic diagram illustrating a configuration including an information processing apparatus, an inspection apparatus, and a printing apparatus.

FIG. 1 is a schematic diagram illustrating an inspection system in an exemplary embodiment, and illustrates a configuration including an information processing apparatus, an inspection apparatus, and a printing apparatus. In the printing apparatus of the present exemplary embodiment, a description will be provided of a printing apparatus employing an electrophotographic method, but the printing apparatus according to the present exemplary embodiment may be a printing apparatus employing any of other types of image forming method, such as an inkjet method and an offset method.

A printing apparatus 0101 is connected to an information processing apparatus 0109 via a cable 0112. The information processing apparatus 0109 is connected to a client computer 0110 and an inspection apparatus 0108 via a network 0113.

The printing apparatus 0101 includes a user interface (UI) panel 0102, a sheet feeding deck 0103, and a sheet feeding deck 0104. Further, an optional deck 0105 that is a three-tier sheet feeding deck is connected to the printing apparatus 0101. The printing apparatus 0101 is, for example, an electrophotographic printing apparatus. The UI panel 0102 is, for example, a user interface including a capacitive touch panel.

The printing apparatus 0101 further includes an inspection unit 0106 and a large capacity stacker 0107. The inspection unit 0106 is connected to the inspection apparatus 0108 via a cable 0114. The large capacity stacker 0107 includes a main tray and a top tray, and the main tray can be loaded with several thousand sheets at a time.

The client computer 0110 generates a print job, the generated print job is transmitted to the information processing apparatus 0109 via the network 0113, and the information processing apparatus 0109 manages the received print job. The print job is transmitted from the information processing apparatus 0109 to the printing apparatus 0101 via the cable 0112, and the printing apparatus 0101 performs a process of printing on a sheet based on the received print job. The print job may be generated and managed by the information processing apparatus 0109, and may be transmitted from the information processing apparatus 0109 to the printing apparatus 0101 via the cable 0112 to be printed by the printing apparatus 0101.

The client computer 0110, the information processing apparatus 0109, and the inspection apparatus 0108 may be connected to the cable 0112 to communicate with the printing apparatus 0101. In other words, the connection configuration of the printing apparatus 0101, the information processing apparatus 0109, and the client computer 0110 in the present exemplary embodiment is merely an example, and any of various connection configurations different from that in the present exemplary embodiment may be employed.

Figure 2:
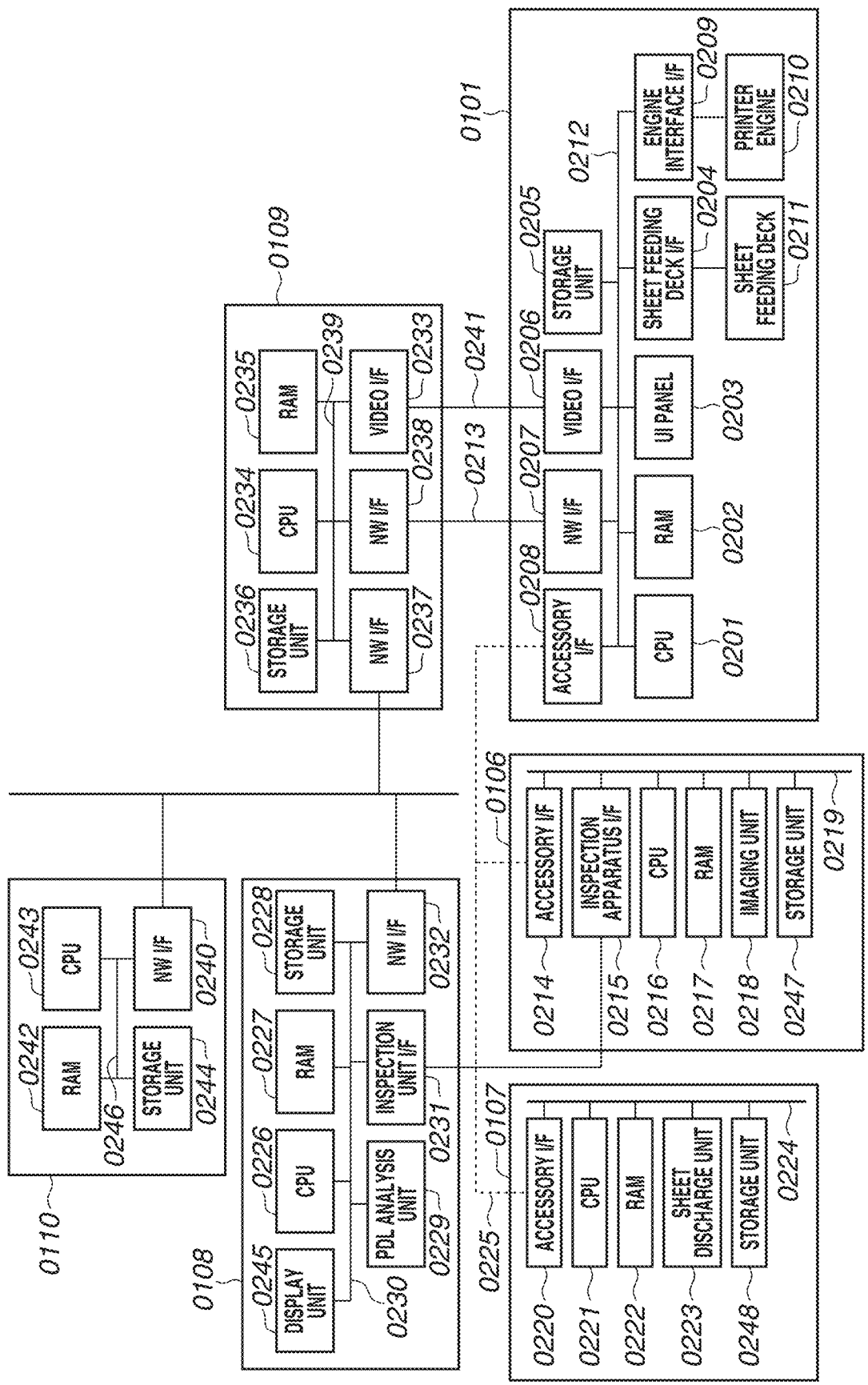
FIG. 2 is a block diagram illustrating a configuration of each of the information processing apparatus, the inspection apparatus, and the printing apparatus.

FIG. 2 is a block diagram illustrating a control configuration of each of the printing apparatus 0101, the inspection apparatus 0108, the large capacity stacker 0107, the information processing apparatus 0109, and the client computer 0110 of the present exemplary embodiment.

A central processing unit (CPU) 0201 is in charge of control and computations in each component in the printing apparatus 0101 via a system bus 0212. The CPU 0201 is in charge of execution of a program stored in a storage unit 0205 and loaded into a random access memory (RAM) 0202. The RAM 0202 is a type of commonly used volatile storage that enables direct access from the CPU 0201, and the RAM 0202 is used as a work area or other temporary data storage area for the CPU 0201. The storage unit 0205 functions as a temporary storage area and a work memory when the printing apparatus 0101 operates.

An engine interface (I/F) 0209 is in charge of control of and communication with a printer engine 0210. A sheet feeding deck I/F 0204 is in charge of control of and communication with a sheet feeding deck 0211. The sheet feeding deck 0211 is a hardware configuration that represents the sheet feeding decks 0103 and 0104 as well as the optional deck 0105 collectively. A UI panel 0203 is a hardware configuration of the UI panel 0102, and is a user interface for performing all types of operations on the printing apparatus 0101. In the present exemplary embodiment, the UI panel 0203 includes a capacitive touch panel.

A network interface (hereinafter, NW I/F) 0207 is connected to a NW I/F 0238 of the information processing apparatus 0109 via a cable 0213, and is in charge of communication between the information processing apparatus 0109 and the printing apparatus 0101. In this example, the interface connected to the system bus 0212 and the interface connected to a system bus 0239 are directly connected, but the information processing apparatus 0109 and the printing apparatus 0101 may be connected by, for example, a network, i.e., the connection form thereof is not limited. A video I/F 0206 is connected to a video I/F 0233 via a video cable 0241, and is in charge of image-data communication between the information processing apparatus 0109 and the printing apparatus 0101.

The connection interface with the printing apparatus 0101 in the information processing apparatus 0109 may be in a form in which the function of the NW I/F 0238 and the function of the video I/F 0233 are integrated. The connection interface with the information processing apparatus 0109 in the printing apparatus 0101 may be in a form in which the function of the NW I/F 0207 and the function of the video I/F 0206 are integrated.

An accessory I/F 0208 is connected to an accessory I/F 0214 and an accessory I/F 0220 via a cable 0225. In other words, the printing apparatus 0101 communicates with the inspection unit 0106 and the large capacity stacker 0107 via the accessory I/Fs 0208, 0214, and 0220.

A CPU 0216 is in charge of control and computations in each component in the inspection unit 0106 via a system bus 0219. The CPU 0216 is also in charge of execution of a program stored in a storage unit 0247 and loaded into a RAM 0217. The RAM 0217 is a type of commonly used volatile storage that enables direct access from the CPU 0216, and the RAM 0217 is used as a work area or other temporary data storage area for the CPU 0216. The storage unit 0247 functions as a temporary storage area and a work memory when the inspection unit 0106 operates. An inspection apparatus I/F 0215 is connected to an inspection unit I/F 0231 via a cable. In other words, the inspection unit 0106 communicates with the inspection apparatus 0108 via the inspection apparatus I/F 0215 and the inspection unit I/F 0231.

An imaging unit 0218 has an imaging function provided with, for example, a contact image sensor (hereinafter, CIS), and the imaging unit 0218 captures an image of a sheet passing through the inspection unit 0106 and transmits the captured image to the inspection apparatus 0108 via the inspection apparatus I/F 0215. The CIS for the imaging unit 0218 is an example of a sensor, and may be other types of sensor, such as a charge coupled device (CCD) image sensor, and the imaging method thereof is not limited.

A CPU 0221 is in charge of control and computations in each component in the large capacity stacker 0107, and execution of a program stored in a storage unit 0248 and loaded into a RAM 0222, via a system bus 0224. The RAM 0222 is a type of commonly used volatile storage that enables direct access from the CPU 0221, and the RAM 0222 is used as a work area or other temporary data storage areas for the CPU 0221. The storage unit 0248 functions as a temporary storage area and a work memory when the large capacity stacker 0107 operates. A sheet discharge unit 0223 is in charge of operation of discharging sheets to the main tray and the top tray, as well as monitoring of the stacking status and control of each of the main tray and the top tray.

A CPU 0226 is in charge of control and computations in each component in the inspection apparatus 0108, and execution of a program stored in a storage unit 0228 and loaded into a RAM 0227, via a system bus 0230. The RAM 0227 is a type of commonly used volatile storage that enables direct access from the CPU 0226, and the RAM 0227 is used as a work area or other temporary data storage area for the CPU 0226.

The storage unit 0228 functions as a temporary storage area and a work memory when the inspection apparatus 0108 operates. A page description language (PDL) analysis unit 0229 reads PDL data such as Portable Document Format (PDF) data, PostScript data, and Printer Command Language (PCL) data received from the client computer 0110 and the information processing apparatus 0109, and executes interpretation processing on the read-in PDL data. A display unit 0245 is, for example, a liquid crystal display connected to the inspection apparatus 0108, and receives an input into the inspection apparatus 0108 from a user, and controls display such as displaying a status of the inspection apparatus 0108.

A CPU 0234 is in charge of control and computations in each component in the information processing apparatus 0109, and execution of a program stored in a storage unit 0236 and loaded into a RAM 0235, via the system bus 0239. The RAM 0235 is a type of commonly used volatile storage that enables direct access from the CPU 0234, and the RAM 0235 is used as a work area or other temporary data storage areas for the CPU 0234.

The storage unit 0236 functions as a temporary storage area and a work memory when the information processing apparatus 0109 operates. A NW I/F 0237 is connected to a NW I/F 0232 and a NW I/F 0240 via a network. The information processing apparatus 0109 communicates with the inspection apparatus 0108 via the NW I/F 0237 and the NW I/F 0232. The information processing apparatus 0109 communicates with the client computer 0110 via the NW I/F 0237 and the NW I/F 0240.

A CPU 0243 is in charge of control and computations in each component in the client computer 0110, and execution of a program stored in a storage unit 0244 and loaded into a RAM 0242, via a system bus 0246. The RAM 0242 is a type of commonly used volatile storage that enables direct access from the CPU 0243, and the RAM 0242 is used as a work area or other temporary data storage areas for the CPU 0243. The storage unit 0244 functions as a temporary storage area and a work memory when the client computer 0110 operates.

Figure 3:
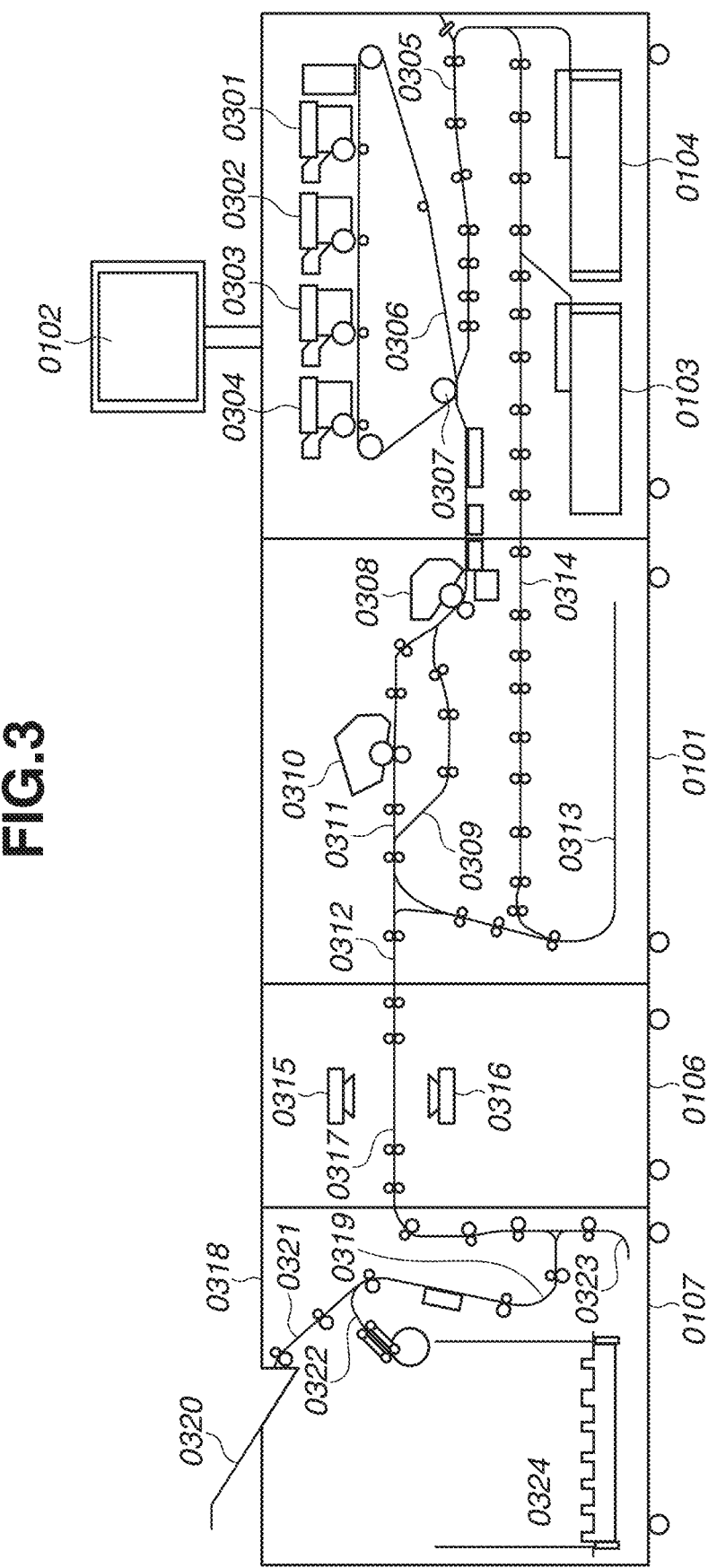
FIG. 3 is a block diagram illustrating an internal configuration of each of an inspection unit, the printing apparatus, and a large capacity stacker.

FIG. 3 is a diagram illustrating an internal configuration of each of the printing apparatus 0101, the inspection unit 0106, and the large capacity stacker 0107.

The printing apparatus 0101 receives an input from the user via the UI panel 0102, and displays a printing or apparatus status. The sheet feeding decks 0103 and 0104 can contain various sheets. In each of the sheet feeding decks 0103 and 0104, only one sheet that is the uppermost sheet among the contained sheets can be separated and the separated sheet can be conveyed to a sheet conveyance path 0305. Development stations 0301 to 0304 form respective toner images using Yellow, Magenta, Cyan, and Black (Y, M, C, and K) color toners, respectively, to form a color image. The toner images formed here are primarily transferred to an intermediate transfer belt 0306.

The intermediate transfer belt 0306 circulates clockwise in FIG. 3, and the toner images are transferred to the sheet conveyed from the sheet conveyance path 0305 at a secondary transfer position 0307. A fixing unit 0308 includes a pressure roller and a heating roller. The sheet passes between these rollers, so that the fixing unit 0308 fixes the toner images to the sheet by fusing and crimping the toners. The sheet that has passed the fixing unit 0308 is conveyed to a sheet conveyance path 0312 via a sheet conveyance path 0309. In a case where further fusing and crimping is desirable for fixing depending on the type of sheet, the sheet that has passed through the fixing unit 0308 is conveyed to a second fixing unit 0310 through an upper sheet conveyance path, and is additionally fused and crimped. The sheet is then conveyed to the sheet conveyance path 0312 via a sheet conveyance path 0311. In a case where an image forming mode is a two-sided mode, the sheet is conveyed to a sheet reversing path 0313 and reversed on the sheet reversing path 0313, the reversed sheet is conveyed to a two-sided conveyance path 0314, and the toner images are transferred to the second side of the sheet at the secondary transfer position 0307.

The inspection unit 0106 contains a CIS 0315 and a CIS 0316 facing each other. The CIS 0315 is a sensor for reading the top surface of the sheet and the CIS 0316 is a sensor for reading the undersurface of the sheet. The inspection unit 0106 scans (captures an image of) the sheet by using the CIS 0315 and the CIS 0316 at the timing when the sheet conveyed to a sheet conveyance path 0317 arrives at a predetermined position. The scanned (captured) image is transmitted to the inspection apparatus 0108 via the inspection apparatus I/F 0215 and the inspection unit I/F 0231. The CPU 0226 determines whether the received image has a defect and notifies the inspection unit 0106 of a determination result via the inspection unit I/F 0231 and the inspection apparatus I/F 0215. The CPU 0216 notifies the large capacity stacker 0107 of the received determination result via the accessory I/Fs 0214 and 0220.

The large capacity stacker 0107 is a stacker that can be loaded with a large amount of sheets. The large capacity stacker 0107 includes a main tray 0324 as a tray to be loaded with sheets. The sheet that has passed through the inspection unit 0106 enters the large capacity stacker 0107 via a sheet conveyance path 0319. The sheet is placed in the main tray 0324 from the sheet conveyance path 0319 via a sheet conveyance path 0322. The large capacity stacker 0107 further includes a top tray 0320 as a sheet discharge tray.

The CPU 0221 discharges a sheet having a defect detected by the inspection apparatus 0108 to the top tray 0320. In a case where the sheet is to be output to the top tray 0320, the sheet is conveyed from the sheet conveyance path 0319 to the top tray 0320 via a sheet conveyance path 0321. A reversing portion 0323 is provided to reverse a sheet. The reversing portion 0323 is used for reversing sheets. The reversing portion 0323 is used in a case where the sheet is to be placed in the main tray 0324. In a case where the sheet is to be placed in the main tray 0324, the sheet is reversed at the reversing portion 0323 once so that the orientation of the sheet when entering and the orientation of the sheet when placed become the same. In a case where the sheet is conveyed to the top tray 0320, the sheet is directly discharged without being flipped when the sheet is placed, and thus the reversing operation at the reversing portion 0323 is not performed.

Figure 4:
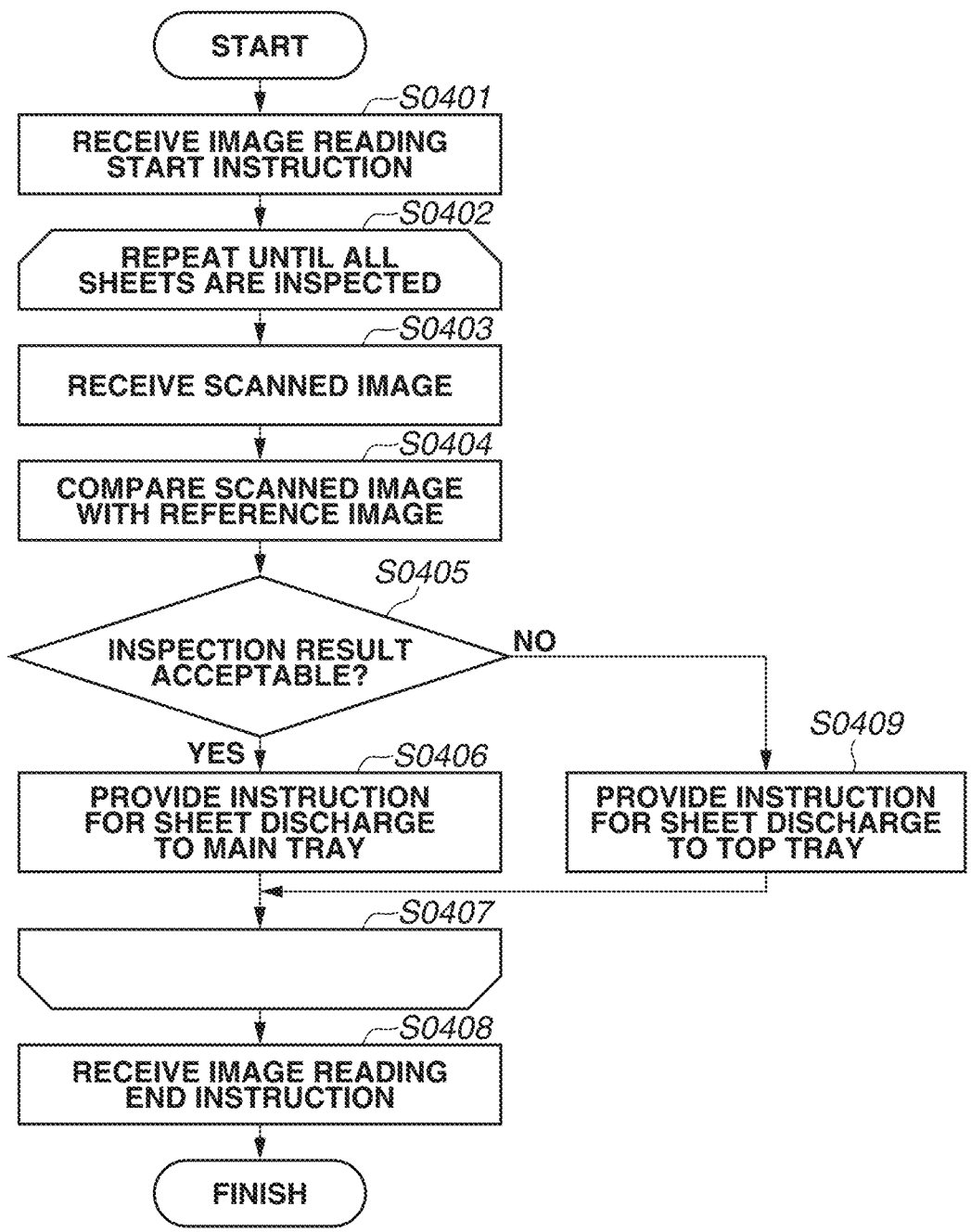
FIG. 4 is a flowchart illustrating basic operation of the inspection apparatus.

FIG. 4 is an operation flowchart illustrating basic operation of the inspection apparatus 0108 in performing inspection.

In step S0401, the CPU 0226 receives an image reading start instruction from the user via the display unit 0245. The operation subsequently proceeds to step S0402, and further to step S0403 in a case where there is a sheet to be an inspection target.

In step S0403, the inspection unit I/F 0231 receives an image scanned by each of the CIS 0315 and the CIS 0316 from the inspection apparatus I/F 0215. Next, in step S0404, the CPU 0226 compares a reference image stored in the RAM 0227, with the scanned image of the inspection target received in step S0403. This comparison processing is performed for the image on one side (the captured image on an inspected surface) in the case of one-sided inspection, and performed for the image on each of both sides in the case of two-sided inspection. As to the reference image, a sheet printed by the printing apparatus 0101 is scanned using each of the CIS 0315 and the CIS 0316, and the resultant images are transmitted from the inspection apparatus I/F 0215 to the inspection unit I/F 0231, and the transmitted images are saved in the RAM 0227 as the reference images, before the start of this flow.

In this comparison operation, at first, the CPU 0226 aligns the image position of the scanned image of the inspection target and the image position of the reference image by using a feature point of the scanned image as an alignment reference point. Next, the CPU 0226 detects whether there is a misalignment of the image with respect to the sheet by analyzing the four corners of the sheet and the alignment reference point of the scanned image, in the scanned image of the inspection target. The CPU 0226 then compares the density value of the scanned image of the inspection target and the density value of the reference image pixel by pixel. If no defect is detected as a result of this comparison, the inspection result is determined to be acceptable. In the case of the two-sided inspection, the inspection result is determined to be acceptable if no defect is detected for the image on each of both sides, and the inspection result is determined to be unacceptable if a defect is detected for the image on either side.

Next, in step S0405, the CPU 0226 determines whether the inspection result is acceptable. If the inspection result is acceptable (YES in step S0405), the processing proceeds to step S0406. In step S0406, the acceptable inspection result is notified from the inspection unit I/F 0231 to the inspection apparatus I/F 0215, i.e., the inspection unit I/F 0231 instructs the inspection apparatus I/F 0215 to discharge the sheet to the main tray 0324 of the large capacity stacker 0107. The processing then proceeds to step S0407, and the operations in step S0402 to step S0407 are repeated until the inspection is completed for all the sheets. When the inspection is completed for all the sheets, the processing proceeds to step S0408. In step S0408, the CPU 0226 then receives an instruction to end image reading at the display unit 0245 from the user.

If the inspection result is unacceptable (NO in step S0405), the processing proceeds to step S0409. In step S0409, the unacceptable inspection result is notified from the inspection unit I/F 0231 to the inspection apparatus I/F 0215, i.e., the inspection unit I/F 0231 instructs the inspection apparatus I/F 0215 to discharge the sheet to the top tray 0320 of the large capacity stacker 0107. The processing then proceeds to step S0407 and the processing ends in a manner similar to the above-described case where the inspection result is acceptable.

The above-described processing is merely an example, and, for example, the image reading start instruction received from the user via the display unit 0245 may be an automatic instruction to be provided simultaneously with a print start instruction in the printing apparatus 0101, the information processing apparatus 0109, or the client computer 0110. The image reading end instruction received from the user via the display unit 0245 may be an automatic instruction to be provided simultaneously with the completion of printing in the printing apparatus 0101, and the mode thereof is not limited.

Figure 5:
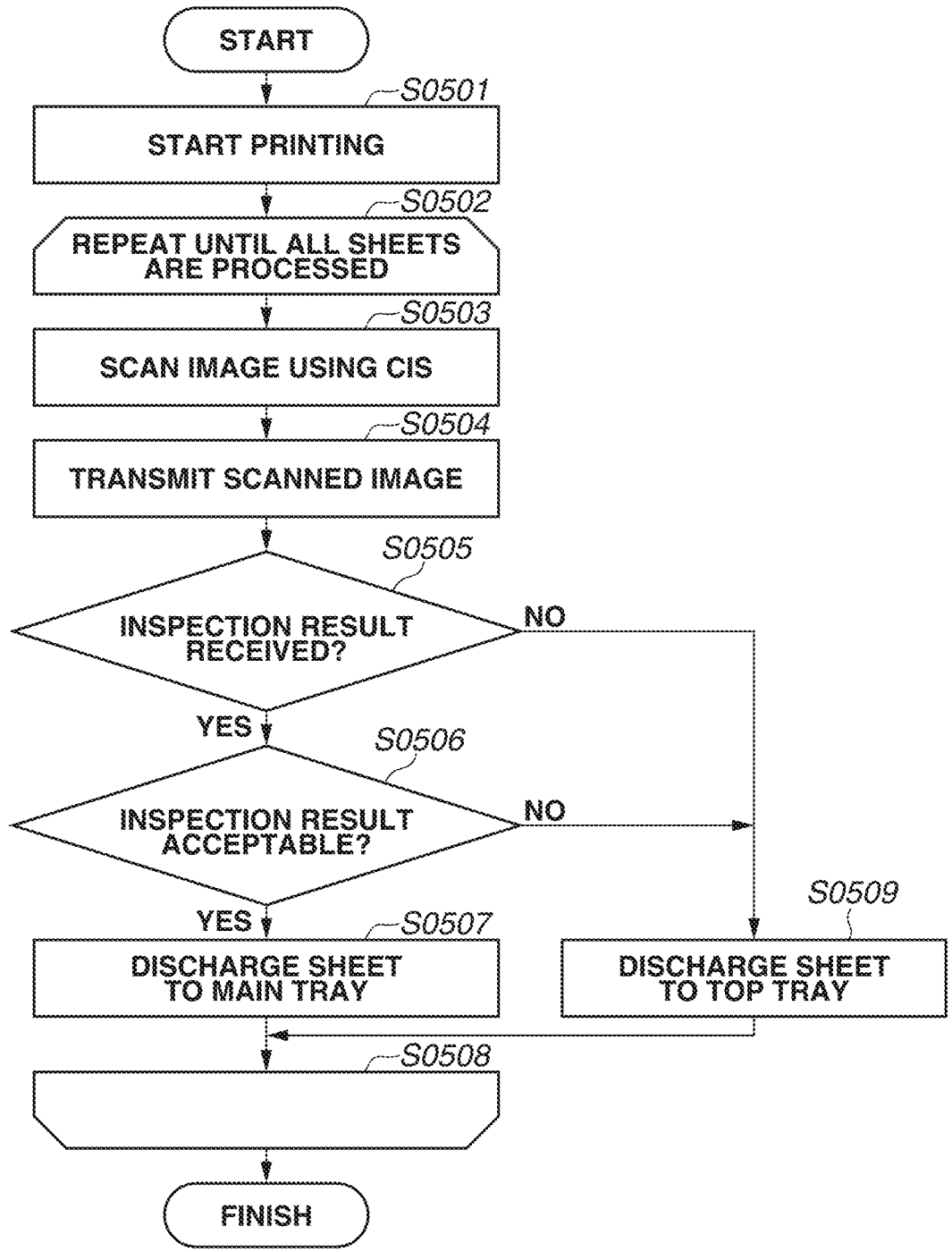
FIG. 5 is a flowchart illustrating basic operation of the inspection unit in executing inspection.

FIG. 5 is an operation flowchart illustrating a basic operation of the inspection unit 0106 in performing inspection.

In step S0501, the CPU 0201 starts printing. Next, the processing proceeds to step S0502, and further to step S0503 in a case where there is a sheet to be an inspection target. In step 0502, the process is repeated until all sheets are processed.

In step S0503, the CIS 0315 and the CIS 0316 each scan an image printed on the conveyed sheet. Next, in step S0504, the inspection apparatus I/F 0215 transmits the image scanned in step S0503 to the inspection unit I/F 0231.

Next, in step S0505, the CPU 0216 determines whether an inspection result from the inspection unit I/F 0231 is received by the inspection apparatus I/F 0215. If the inspection result is received (YES in step S0505), the processing proceeds to step S0506. In step S0506, the CPU 0216 determines whether the inspection result is acceptable. If the inspection result is acceptable (YES in step S0506), the processing proceeds to step S0507. In step S0507, the accessory I/F 0214 instructs the accessory I/F 0220 to discharge the sheet on which the image scanned in step S0503 is printed to the main tray 0324 of the large capacity stacker 0107. The processing proceeds to step S0508, and the operations in step S0502 to step S0508 are repeated until the inspection is completed for all the sheets. When the inspection is completed for all the sheets, printing is completed, and thus the processing ends.

If the inspection result is unacceptable (NO in step S0506), the processing proceeds to step S0509. In step S0509, the accessory I/F 0214 instructs the accessory I/F 0220 to discharge the sheet on which the image scanned in step S0503 is printed to the top tray 0320 of the large capacity stacker 0107. The processing then proceeds to step S0508, and the processing ends in a manner similar to the above-described case where the inspection result is acceptable.

If the inspection result is not received (NO in step S0505) due to some causes, such as a situation where the inspection apparatus 0108 is not ready for inspection and a situation where a computation in the inspection apparatus 0108 is late, the processing proceeds to step S0509. In this process, the CPU 0216 notifies the accessory I/F 0214 of the discharge of the sheet to the top tray 0320 so that a product with the acceptable inspection result and a product with the unacceptable inspection are not mixed. The accessory I/F 0214 instructs the accessory I/F 0220 to discharge the sheet directly to a discharge destination designated in a print job, and the processing proceeds to step S0508. Afterward, the processing ends in a manner similar to the above-described case where the inspection result is received.

Figure 6A:
Figure 6B:
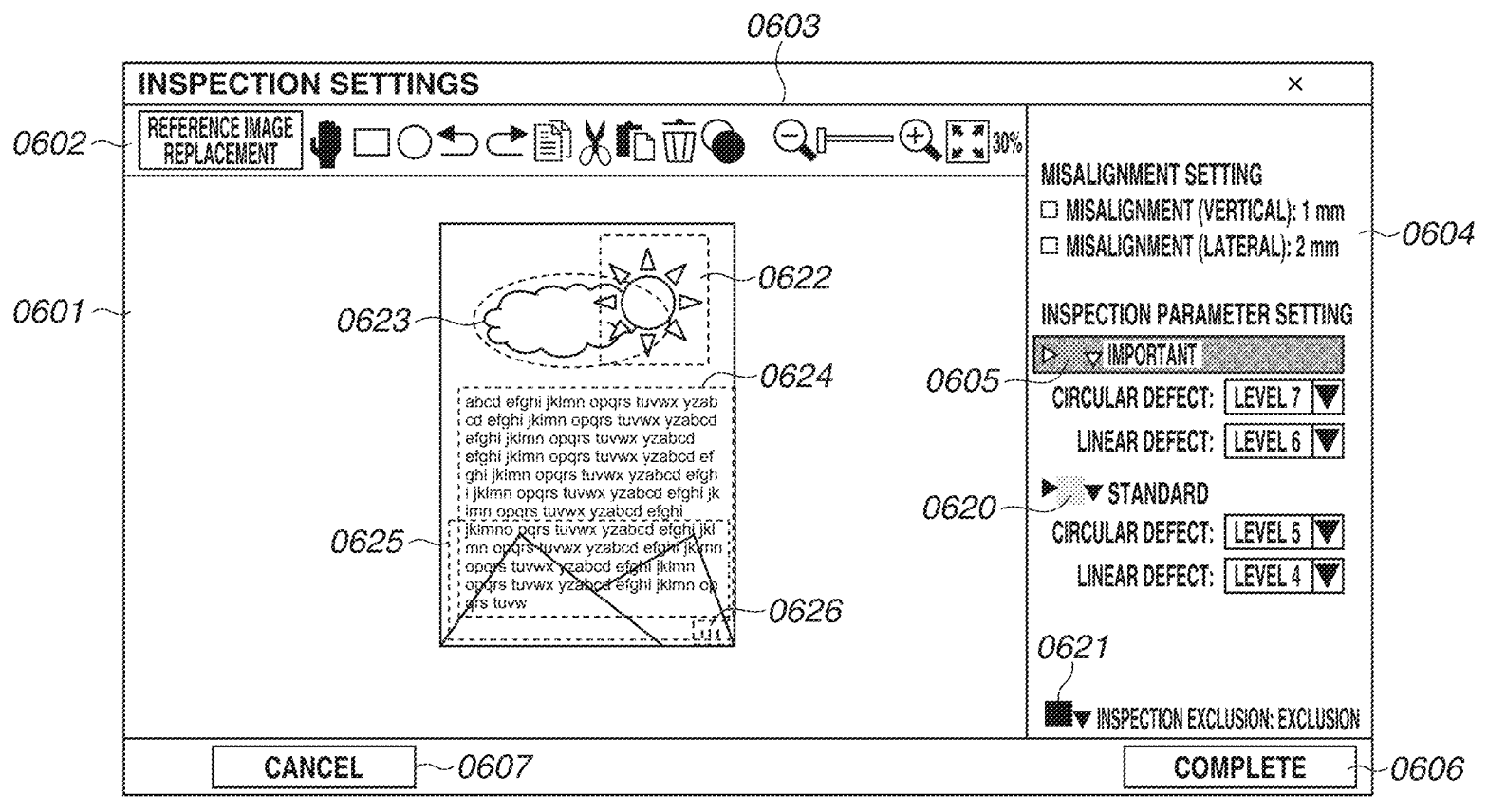

FIGS. 6A, 6B, and 6C each illustrate an inspection setting screen displayed on the display unit 0245 of the inspection apparatus 0108. An inspection setting screen 0601 includes a menu bar 0602 and an inspection parameter setting portion 0604. Displayed in the inspection setting screen 0601 is a reference image having been registered in an inspection job to which inspection settings are to be applied.

The menu bar 0602 includes an inspection criterion confirmation button 0603. The menu bar 0602 further includes a reference image replacement button 0608 for replacing a reference image having been registered. The inspection criterion confirmation button 0603 also serves as a display screen switching button for switching between two display screens to be described below. The menu bar 0602 further includes a button 0609 for switching a mouse pointer (not illustrated) for the display unit 0245 to receive an instruction from the user at the coordinates thereof, between "grab" and "pointer". The menu bar 0602 yet further includes a button 0610 for designating an inspection region (described below) with a rectangle, and a button 0611 for designating the inspection region with an oval. The menu bar 0602 yet further includes a button 0612 for undoing an executed process, a button 0613 for redoing a process, a button 0614 for copying the inspection region, a button 0615 for clipping, a button 0616 for pasting, and a button 0617 for deletion. The menu bar 0602 yet further includes a button 0618 for changing the zoom magnification and a button 0619 for fitting a displayed image to the screen. The user sets the inspection region for each inspection criterion on the screen, by designating a button included in the menu bar 0602. For example, the user can designate an inspection criterion "important" by selecting an item 0605 with the mouse, and can further designate a rectangular inspection region by selecting the button 0610 with the mouse. Afterward, the user designates, for example, a region 0622 illustrated in FIG. 6B on the image.

The inspection parameter setting portion 0604 receives a misalignment setting and an inspection parameter setting from the user. The misalignment in the misalignment setting includes a permissible value for a misalignment, and the permissible value can be set by the user. FIG. 6A illustrates a setting for permitting a misalignment up to 1 mm in a sheet conveyance direction as "misalignment (vertical)", and a misalignment up to 2 mm in a main scanning direction as "misalignment (lateral)". In the printing apparatus 0101, a conveyance misalignment can occur during sheet conveyance, or a minute misalignment of the printing position of an image with each sheet can occur. To avoid a decrease in inspection accuracy due to the occurrence of such a misalignment, the permissible value for the misalignment is defined.

Further, in the inspection parameter setting, the user can view an inspection level for each of a circular defect and a linear defect with respect to each inspection criterion ("important" and "standard"), and change an inspection level in a combo box. In the present exemplary embodiment, inspection levels are defined as 7, 6, 5, 4, 3, 2, and 1 in descending order of strictness, and thus "important" and "standard" are set not to be reversed in terms of inspection level. This can be implemented by, for example, changing the display such that only the inspection level 6 or 7 is enabled to be selected in "important" in a case where the inspection level 5 is selected in "standard". In the present exemplary embodiment, a region (an inspection exclusion region) for which an inspection criterion "exclusion" is designated is not to be inspected, and thus there is no combo box for selecting an inspection level.

The user can change the color of the frame of the inspection region to which the corresponding inspection criterion is to be applied, by designating the item 0605. When the item 0605 is clicked, for example, a color selection menu (not illustrated) opens and presents options, and the display unit 0245 receives the change of the color based on one selected from among the options by the user.

FIG. 6B illustrates a state where the inspection region is rendered by the user, and the display unit 0245 receives selection and various settings made by the user. FIG. 6B indicates that the inspection criterion "important" is currently selected by displaying the option "important" in reverse video. In FIG. 6B, the inspection criterion "important" is designated for inspection regions 0622, 0623, and 0625. The inspection criterion "standard" is designated for an inspection region 0624. The inspection criterion "exclusion" is designated for an inspection region 0626.

In the present exemplary embodiment, in a case where the inspection regions overlap (e.g., regions 0623 and 0622) as illustrated in FIG. 6B, the inspection criterion is applied in order of priority, i.e., in the order of the inspection exclusion, the inspection levels 7, 6, 5, 4, 3, 2, and 1. This can be implemented by, for example, performing the inspection after determining with which inspection criterion each pixel is to be inspected, based on coordinates in the image in the inspection. Alternatively, all the pixels may be inspected at each inspection level once, and if the same pixels are redundantly inspected at different inspection levels, the inspection result may be determined based on the above-described order of priority. As the inspection level becomes higher, the determination criterion for the inspection is set to a stricter level. In the present exemplary embodiment, the region for which the inspection exclusion is designated is assumed to be such a region where a number different for each sheet is printed. Thus, the inspection exclusion is assigned the highest priority so that this region is not always inspected. However, for example, in a case where it is desirable to always inspect every designated region, the inspection exclusion may be assigned the lowest priority. In either case, information indicating the priority is retained and the inspection criterion is applied based on the priority. For the inspection levels, the order of priority is set so that a higher priority is assigned to a higher inspection level.

When the inspection criterion confirmation button 0603 is pressed, a state illustrated in FIG. 6C appears. This state expresses with which inspection criterion the pixel is to be inspected through area filling, based on the above-described order of priority. Regions 0627 and 0628 are each indicated as a region corresponding to the inspection criterion "important". A region 0629 is indicated as a region corresponding to the inspection criterion "standard". A region 0630 is indicated as a region corresponding to the inspection "exclusion". In the present exemplary embodiment, the color of each of the regions 0627 and 0628 and the color of the item 0605 are set to the same, the color of the region 0629 and the color of an item 0620 are set to the same, and the color of the region 0630 and the color of an item 0621 are set to the same. This makes it easy for the user to check which inspection criterion corresponds to which region. The example in which the colors are made the same is described, but instead of the color, a pattern may be used if a plurality of criteria and regions corresponding thereto can be identified. Further, in FIG. 6B as well, the color of the frame line of each of the regions 0622, 0623, and 0625 may be the same as the color of each of the region 0627, the region 0628, and the item 0605. The color of the frame line of the region 0624 may be the same as the color of each of the region 0629 and the item 0620, and the color of the frame line of the region 0626 may be the same as the color of each of the region 0630 and the item 0621.

When the inspection criterion confirmation button 0603 is pressed again, the state illustrated in FIG. 6B appears. In FIG. 6B, the user can check that the region 0624 and the region 0625 overlap each other, and the region 0625 and the region 0626 overlap each other. In FIG. 6C, an overlapping region between the region 0624 and the region 0625 in FIG. 6B is the region 0628 and thus the user can check that this overlapping region corresponds to the inspection criterion "important". Further, an overlapping region between the region 0625 and the region 0626 in FIG. 6B is the region 0630 and thus the user can confirm that this overlapping region corresponds to the inspection criterion "exclusion".

The operation performed in each of FIG. 6B and FIG. 6C may be, instead of being the press of the inspection criterion confirmation button 0603, for example, a mode in which the state illustrated in FIG. 6C appears when the mouse pointer is placed at the inspection criterion confirmation button 0603 may be employed. In such a case, the state illustrated in FIG. 6B appears when the mouse pointer leaves the inspection criterion confirmation button 0603.

The inspection setting screen 0601 further includes a "cancel" button 0607 for cancelling the setting and a "complete" button 0606 for ending the setting.

Figure 7:
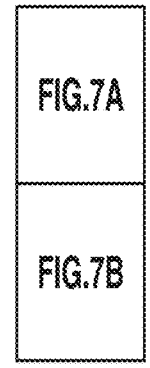
FIG. 7, which is comprised of FIGS. 7A and 7B, is a flowchart illustrating inspection region setting operation of the inspection apparatus.
Figure 7A:
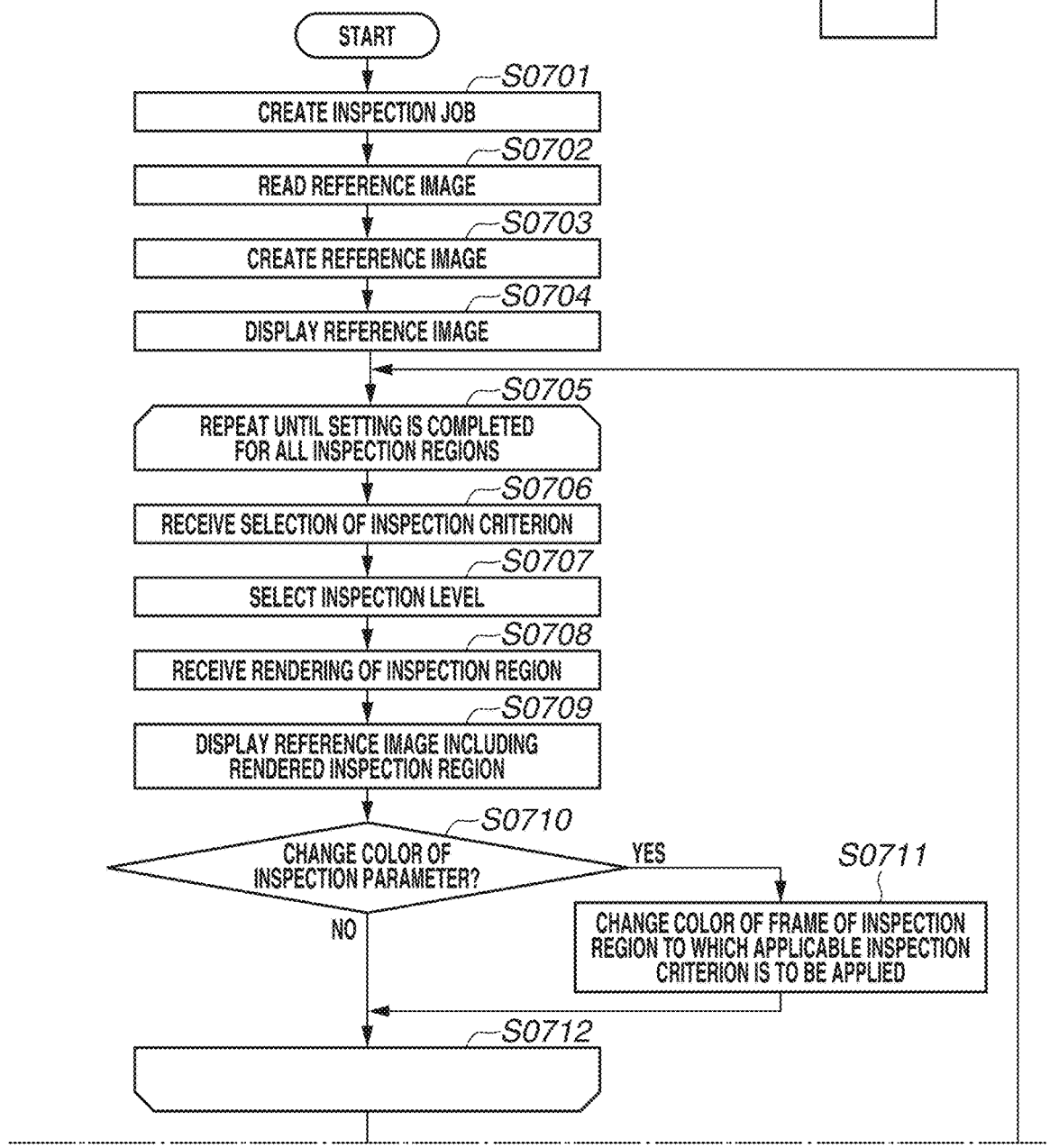
Figure 7B:
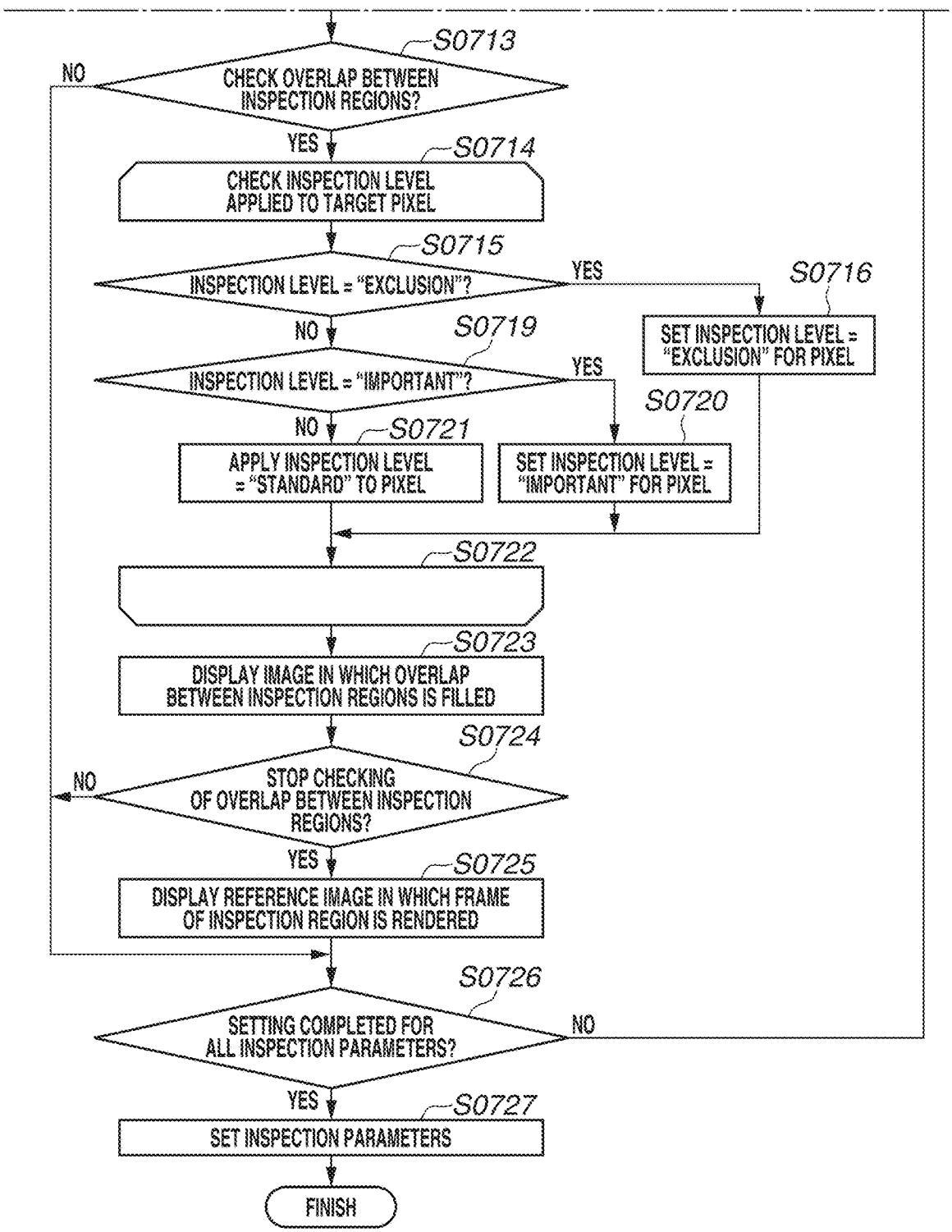

Processing corresponding to a characteristic of the present exemplary embodiment will be described below with reference to a flowchart in FIGS. 7A and 7B.

A program for the printing apparatus 0101 according to the processing of this flowchart is stored in the storage unit 0205 of the printing apparatus 0101, read out into the RAM 0202, and executed by the CPU 0201. A program for the inspection apparatus 0108 according to the processing of the flowchart is stored in the storage unit 0228 of the inspection apparatus 0108, read out into the program into the RAM 0227, and executed by the CPU 0226. A program for the information processing apparatus 0109 according to the processing of the flowchart is stored in the storage unit 0236 of the information processing apparatus 0109, read out into the RAM 0235, and is executed by the CPU 0234. A program for the client computer 0110 according to the processing of the flowchart is stored in the storage unit 0244 of the client computer 0110, and read out into the RAM 0242, so that the CPU 0243 executes the program.

First, in step S0701, the CPU 0226 creates an inspection job. The inspection job is the unit of a record that holds information about the inspection, such as the reference image, the number of inspection sheets, and the inspection settings. The inspection job also includes information indicating whether the inspection target is two-sided or one-sided. In a case where the information indicates the two-sided inspection target, the following processing is performed on an image on each of both sides. In a case where the information indicates the one-sided inspection target, the following processing is performed on an image on one side. Next, in step S0702, the CPU 0226 starts reading the reference image. At this time, the inspection unit I/F 0231 notifies the inspection apparatus I/F 0215 of the start of the reading of the reference image. The CPU 0216 then instructs the imaging unit 0218 to prepare for the reading of the reference image, and when the preparation is completed, the CPU 0216 notifies the CPU 0226 of the completion of the preparation via the inspection apparatus I/F 0215 and the inspection unit I/F 0231. The inspection unit I/F 0231 receives the image printed by the printing apparatus 0101 and scanned by each of the CIS 0315 and the CIS 0316 from the inspection apparatus I/F 0215. In the case where the inspection target is one-sided, the inspection unit I/F 0231 receives (acquires) the image scanned by each of the CIS 0315 and the CIS 0316, and in and after step S703, only the image obtained by scanning the printed surface is used.

Next, in step S0703, the CPU 0226 creates the reference image. In a case where the reference image is to be created based only on an image obtained by scanning one printed sheet, the reference image is the scanned image received in step S702. In a case where the reference image is to be created by combining a plurality of images, a plurality of scanned images is received in step S702, and the reference image is created by combining the received images. Examples of combining images to provide the reference image include: (1) taking the average of all the images; (2) perform a filtering operation on the images, etc. Next, in step S0704, the CPU 0226 displays the reference image created in step S0703 on the display unit 0245.

Next, the processing proceeds to step S0705, and in step S0706 to step S0708, the display unit 0245 receives setting of the inspection region desired by the user via the buttons and the inspection parameter setting portion 0604 included in the menu bar 0602. In step S0706, the display unit 0245 receives selection of the inspection criterion by the user via the inspection parameter setting portion 0604. Next, in step S0707, the display unit 0245 selects the inspection level to be applied to the inspection criterion selected in step S0706 via the inspection parameter setting portion 0604. The processing may proceed in the order in which the user selects the inspection criterion after setting the inspection level for the inspection criterion, i.e., the order is not limited.

Next, in step S0708, the display unit 0245 receives rendering of the inspection region by the user after receiving selection of the rectangle or oval in the menu bar 0602. Next, in step S0709, the display unit 0245 displays the reference image including the rendered inspection region in the inspection setting screen 0601.

Next, in step S0710, the CPU 0226 determines whether the color of the inspection parameter is to be changed. If the color of the inspection parameter is to be changed (YES in step S0710), the processing proceeds to step S0711. In step S0711, the display unit 0245 changes the color of the frame of the inspection region to which the corresponding inspection criterion is to be applied. Subsequently, the processing proceeds to step S0712, and the operations in step S0705 to step S0712 are repeated until all the inspection regions are rendered and the colors are determined for the inspection regions. Even if the color of the inspection parameter is not to be changed (NO step S0710), the processing proceeds to step S0712, and the processing can proceed in a manner similar to the above-described case.

In the present exemplary embodiment, the processing has been described in which the color of the frame of the inspection region is changed after the region is rendered, but the processing may proceed in the order in which the frame of the inspection region to which the inspection criterion is to be applied is rendered after the color corresponding to the inspection criterion is changed. In other words, the rendering of the inspection region and the changing of the color of the frame of the inspection region are not limited in terms of timing and order.

Next, in step S0713, the CPU 0226 determines whether an instruction to check the overlap between the inspection regions from the user is received by the display unit 0245 via the inspection criterion confirmation button 0603. If the instruction is received (YES in step S0713), the processing proceeds to step S0714. In step S0714, the CPU 0226 checks the inspection level applied to a target pixel. In step S0715, the CPU 0226 determines whether the inspection level is "exclusion". If the inspection level is determined to be "exclusion" (YES in step S0715), the processing proceeds to step S0716. In step S0716, the inspection level "exclusion" is set for the pixel and the processing proceeds to step S0722. If the inspection level is not determined to be "exclusion" (NO in step S0715), the processing proceeds to step S0719. In step S0719, the CPU 0226 determines whether the inspection level is "important". If the inspection level is determined to be "important" (YES in step S0719), the processing proceeds to step S0720. In step S0720, the inspection level "important" is set for the pixel and the processing proceeds to step S0722. If the inspection level is not determined to be "important" (NO in step S0719), the processing proceeds to step S0721. In step S0721, the inspection level "standard" is applied to the pixel, and the processing proceeds to step S0722.

Afterward, the operations in step S0714 to step S0722 are repeated until the inspection levels are applied to all the pixels. In step S0723, the display unit 0245 displays an image (corresponding to the image in FIG. 6C) in which the overlap between the inspection regions is filled, based on the inspection level of each of the pixels applied up to step S0722. FIG. 6C illustrates the screen in which the inspection level identified based on the priority is displayed for the overlap region. In step S0724, the CPU 0226 determines whether an instruction to stop the checking of the overlap between the inspection regions from the user is received by the display unit 0245 via the inspection criterion confirmation button 0603. If the instruction is received (YES in step S0724), the processing proceeds to step S0725. In step S0725, the display unit 0245 displays the reference image (corresponding to the image in FIG. 6B) in which the frame of the inspection region is rendered, and the processing proceeds to step S0726. FIG. 6B illustrates the screen in which the frames of the plurality of inspection regions are displayed. If the instruction to stop the checking of the overlap between the inspection regions from the user is not received (NO in step S0724), the processing directly proceeds to step S0726.

In step S0726, the CPU 0226 determines whether the setting is completed for all the inspection parameters. The CPU 226 determines that the setting is completed for all the inspection parameters in a case where the display unit 0245 receives a notification of the completion of the inspection parameter setting from the user via the complete button 0606. If the setting is completed (YES in step S0726), the processing proceeds to step S0727. In step S0727, the inspection parameters are set for the reference images and saved into the RAM 0227 so that the inspection parameters can be used for the inspection. If the setting is not completed, i.e., if the notification of the completion of the inspection parameter setting from the user is not received by the display unit 0245 via the complete button 0606 (NO in step S0726), the processing returns to step S0705 and is repeated until the setting of the inspection parameters is completed.

If the instruction to check the overlap between the inspection regions from the user is not received by the display unit 0245 via the inspection criterion confirmation button 0603 (NO in step S0713), the processing proceeds to step S0726. In step S0726, the processing can end in a manner similar to the above-described case.

Next, operation of the inspection apparatus 0108 when the inspection is performed using the inspection settings set in the above-described procedure will be described with reference to a flowchart in FIG. 8.

First, in step S0801, the CPU 0226 starts reading the inspection target image. At this moment, the inspection unit I/F 0231 notifies the inspection apparatus I/F 0215 of the start of the reading of the inspection target image. The CPU 0216 then instructs the imaging unit 0218 to prepare for the reading of the inspection target image, and when the preparation is completed, the CPU 0216 notifies the CPU 0226 of the completion of the preparation via the inspection apparatus I/F 0215 and the inspection unit I/F 0231. In step S0802, the client computer 0110 transmits PDF data to the information processing apparatus 0109 via the NW I/F 0240 and the NW I/F 0237. Further, the CPU 0234 transmits the PDF data to the printing apparatus 0101 via the NW I/F 0238, the NW I/F 0207, the video I/F 0233, and the video I/F 0206. The CPU 0201 prints this PDF data. The CIS 0315 and the CIS 0316 then each scan the printed image when the image passes through the sheet conveyance path 0317. The CPU 0226 receives the scanned image from the inspection unit 0106 via the inspection apparatus I/F 0215 and the inspection unit I/F 0231. The PDF data may be imported to the information processing apparatus 0109 beforehand, and the CPU 0234 may read out the PDF data from the storage unit 0236 in step S0702. The PDF data may be stored in the storage unit 0205 of the printing apparatus 0101 and the CPU 0201 may read out the PDF data from the storage unit 0205. In other words, the PDF data is not limited in terms of mode if the PDF data is printed by the printing apparatus 0101.

Next, in step S0803, the CPU 0226 reads out the reference image created in step S0703 from the storage unit 0228, and compares the reference image with the inspection target image received in step S0802, thus determining whether a misalignment is unacceptable. The CPU 0226 compares the positional relationship between the sheet and the printed image in the reference image and the positional relationship between the sheet and the printed image in the inspection target image received in step S0802. The comparison between the positional relationships is calculated using, for example, the four corners of the sheet, and an affine transformation value of an image feature point extracted through edge detection of the printed image. If the position of the printed image relative to the sheet deviates by the permissible value for misalignment set beforehand, i.e., the misalignment is unacceptable (YES in step S0803), the processing proceeds to step S0814. In step S0814, the CPU 0226 notifies the CPU 0216 of the unacceptable inspection result, via the inspection unit I/F 0231 and the inspection apparatus I/F 0215. The CPU 0216 then notifies the CPU 0221 of the unacceptable inspection result, via the accessory I/Fs 0214 and 0220. The CPU 0221 instructs the sheet discharge unit 0223 to discharge the sheet to the top tray 0320 and the processing ends.

If a misalignment of the position of the printed image relative to the sheet falls within the range of the permissible values for misalignments in the inspection target image, i.e., the misalignment is not unacceptable (NO in step S0803), the processing proceeds to step S0804. In step S0804, the CPU 0226 starts inspecting the pixels of the inspection target image one by one. In step S0805, the CPU 0226 refers to the inspection settings made in step S0727, and checks whether the inspection criterion "exclusion" is set for the pixel. If the inspection criterion "exclusion" is set (YES in step S0805), the processing proceeds to step S0811, without inspecting the pixel.

If the inspection criterion "exclusion" is not set for the pixel (NO in step S0805), the processing proceeds to step S0808. In step S0808, the CPU 0226 confirms whether the inspection criterion "important" is set. If the inspection criterion "important" is set (YES in step S0808), the processing proceeds to step S0809. In step S0809, the CPU 0226 inspects the pixel using the inspection criterion "important", and the processing proceeds to step S0811. If the inspection criterion "important" is not set (NO in step S0808), the processing proceeds to step S0810. In step S0810, the CPU 0226 inspects the pixel using the inspection criterion "standard", and the processing proceeds to step S0811.

If the inspection is not completed for all the pixels in step S0811, the operation returns to step S0804, and the inspection is performed until the inspection is completed for all the pixels. When the inspection is completed for all the pixels, the processing proceeds to step S0816. In step S0816, the CPU 0226 checks whether the time for notifying the inspection result from the inspection unit I/F 0231 to the inspection apparatus I/F 0215 has run out. This step is provided because if an instruction to switch the discharge destination between the main tray 0324 and the top tray 0320 is not issued within a certain period of time, the sheet is conveyed and the time for switching runs out. If the inspection apparatus I/F 0215 cannot notify the inspection result (YES in step S0816), the processing proceeds to step S0814. In step S0814, the inspection unit I/F 0231 instructs the inspection apparatus I/F 0215 to discharge the sheet to the top tray 0320. If the inspection apparatus I/F 0215 can notify the inspection result (NO in step S0816), the processing proceeds to step S0812. In step S0812, the CPU 0226 checks whether a pixel corresponding to the unacceptable inspection result is present in either step 0809 or step 0810. If a pixel corresponding to the unacceptable inspection result is present (YES in step S0812), the processing proceeds to step S0814, and afterward, the processing ends in a manner similar to the above-described case where the misalignment is unacceptable. If a pixel corresponding to the unacceptable inspection result is not present (NO in step S0812), the processing proceeds to step S0813. In step S0813, the inspection unit I/F 0231 instructs the inspection apparatus I/F 0215 to discharge the sheet to the main tray 0324, and the processing proceeds to step S0815. Afterward, the operations in step S0801 to step S0815 are repeated until the inspection is completed for all the inspection target images, and the processing ends.

In the present exemplary embodiment, the configuration has been described in which a misalignment is first detected before the inspection for the circular defect and the linear defect, but these may be performed in parallel, or the circular defect and the linear defect may be inspected first, i.e., the mode thereof is not limited.

In the present exemplary embodiment, the example has been described in which the printing apparatus 0101 and the inspection apparatus 0108 are separate apparatuses, but a means corresponding to the inspection apparatus may be included in the printing apparatus.

According to the present exemplary embodiment, the above-described procedure enables the user to easily recognize the inspection criterion applied to each pixel even in a case where the inspection regions overlap in the inspection apparatus. This makes it easy for the user to apply a desired inspection criterion to a desired inspection target, so that an inspection desired by the user can be implemented without operation mistakes.

According to the above-described exemplary embodiment, the user can easily recognize which inspection criterion is to be applied to a pixel in a case where there is an overlap between inspection regions to which different inspection criteria are applied.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image inspection apparatus that sets an inspection region for performing inspection of a printed sheet formed on a sheet, the image inspection apparatus comprising:
   a memory containing instructions; and
   a processor coupled with the memory and configured to execute the instructions to perform operations comprising:
      displaying a reference image on a screen;
      selecting a certain inspection level from among a plurality of inspection levels as an inspection criterion;
      first setting, for the reference image displayed on the screen, the inspection region for which the inspection is performed using the selected inspection criterion;
      second setting, for the inspection criterion, a display color of the inspection region to be displayed on the screen; and
      inspecting the printed sheet by comparing the reference image and a read image of the printed sheet based on the plurality of set inspection regions,
   wherein the second setting operation includes, if a first color is set for a first inspection criterion, not allowing to set the first color for a second inspection criterion that is different from the first inspection criterion, and
   wherein the displaying operation includes displaying a first inspection region set by the first setting operation with the first color, and displaying a second inspection region with a second color that is different from the first color, the first and second inspection regions being inspected based on different inspection criteria.

2. The image inspection apparatus according to claim 1, wherein the displaying operation includes, before the inspection is performed by the inspecting operation, displaying the reference image on the screen, displaying the first inspection region with the first color, and displaying the second inspection region with the second color that is different from the first color.

3. The image inspection apparatus according to claim 1, wherein the second setting operation includes setting, for the inspection criterion, a color selected from among a plurality of presented options.

4. The image inspection apparatus according to claim 1, wherein the displaying operation includes displaying the first inspection region and a third inspection region with the first color, the third inspection region being inspected by using the same inspection criterion as the first inspection region.

5. The image inspection apparatus according to claim 1, wherein the first inspection region and the second inspection region are displayed on the reference image, the first and second inspection regions being set by the first setting operation.

6. The image inspection apparatus according to claim 1, wherein the displaying operation includes simultaneously displaying correspondence relation between the inspection criterion and the color.

7. The image inspection apparatus according to claim 1, wherein the displaying operation includes displaying the first inspection region filled with the first color, and displaying the second inspection region filled with the second color.

8. The image inspection apparatus according to claim 1, wherein the displaying operation includes changing the display color of the first inspection region from the first color to a third color different from the first color if the first color that is set for the first inspection criterion is changed to the third color.

9. A method for controlling an image inspection apparatus that sets, for a reference image displayed on a screen, an inspection region for performing inspection of a printed sheet formed on a sheet, the method comprising:
  selecting a certain inspection level from among a plurality of inspection levels as an inspection criterion;
  first setting, for the reference image displayed on the screen, an inspection region for which the inspection is performed using the selected inspection criterion;
  second setting, for the inspection criterion, a display color of the inspection region to be displayed on the screen; and
  inspecting the printed sheet by comparing the reference image and a read image of the printed sheet based on the plurality of set inspection regions,
  wherein the second setting includes, if a first color is set for a first inspection criterion, not allowing to set the first color for a second inspection criterion that is different from the first inspection criterion, and
  wherein a first inspection region set by the first setting is displayed with the first color on the screen, and a second inspection region is displayed with a second color different from the first color on the screen, the first and second inspection regions being inspected based on different inspection criteria.

10. The method according to claim 9, wherein
  the image inspection apparatus is configured to perform an operation of controlling display of the screen, and
  the controlling operation includes, before the inspection is performed by the inspecting, displaying the reference image on the screen, displaying the first inspection region with the first color, and displaying the second inspection region with the second color that is different from the first color.

11. The method according to claim 9, wherein the second setting includes setting a color selected from among a plurality of presented options for the inspection criterion.

12. The method according to claim 10, wherein the controlling operation includes displaying the first inspection region and a third inspection region with the first color, the third inspection region being inspected by using the same inspection criterion as the first inspection region.

13. The method according to claim 9, wherein the first inspection region and the second inspection region are displayed on the reference image, the first and second inspection regions being set by the first setting.

14. The method according to claim 10, wherein the controlling operation includes simultaneously displaying correspondence relation between the inspection criterion and the color.

15. The method according to claim 10, wherein the controlling operation includes displaying the first inspection region filled with the first color, and displaying the second inspection region filled with the second color.

16. The method according to claim 10, wherein the displaying operation includes changing the display color of the first inspection region from the first color to a third color different from the first color if the first color that is set for the first inspection criterion is changed to the third color.

* * * * *